Mar. 3, 1925.
O. P. M. PFAFFENBERGER
1,528,564
AIR HEATER CONSTRUCTION
Filed Feb. 4, 1924
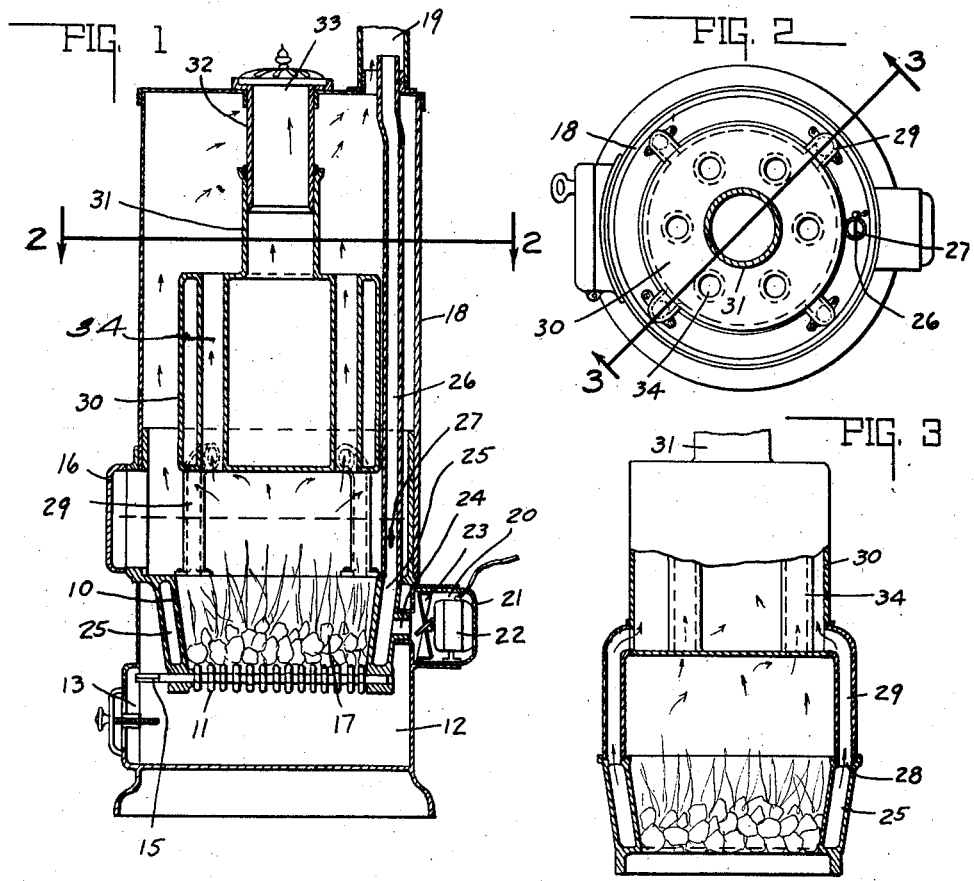
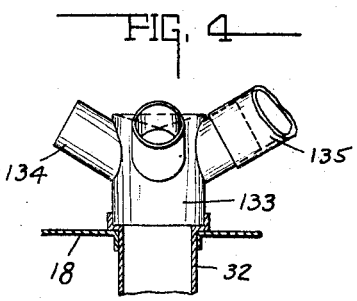
INVENTOR.
OLIVER P.M. PFAFFENBERGER.
BY
ATTORNEYS.

Patented Mar. 3, 1925.

1,528,564

UNITED STATES PATENT OFFICE.

OLIVER P. M. PFAFFENBERGER, OF INDIANAPOLIS, INDIANA.

AIR-HEATER CONSTRUCTION.

Application filed February 4, 1924. Serial No. 690,497.

*To all whom it may concern:*

Be it known that I, OLIVER P. M. PFAFFENBERGER, a citizen of the United States, and a resident of Indianapolis, county of Marion, and State of Indiana, have invented a certain new and useful Air-Heater Construction; and I do hereby declare that the following is a full, clear, and exact description thereof, reference being had to the accompanying drawings, in which like numerals refer to like parts.

This invention relates to a heater construction for heating air, which heated air is used for heating purposes.

The chief object of the invention is to provide a construction which abstracts from the heating arrangement a greater amount of heat from that normally available for heat transfer and supplies the same for normal use.

The chief feature of the invention consists in associating with the combustion and heat transferring portion of a hot air heater a supplementary air conducting and heat transferring arrangement cooperating with the hot air heater to transfer a portion of the otherwise normally non-transferable heat in a hot air heater to the auxiliary air supply for heating the same by a portion of the normally non-available heat in the hot air heater.

Another feature of the invention consists in the arrangement of several parts and the association therewith in a hot air heater for securing relatively quick starting of the combustion in the hot air heater.

The full nature of the invention will be understood from the accompanying drawings and the following description and claims:

In the drawings, Fig. 1 is a central sectional view of one form of hot air heater with the auxiliary air supplying and heat transferring construction incorporated therein including the heater starting arrangement as well. Fig. 2 is a transverse sectional view taken on the line 2—2 of Fig. 1 and in the direction of the arrows. Fig. 3 is a view taken on the line 3—3 of Fig. 2 and in the direction of the arrows, parts being shown in section to illustrate the same and other parts in detail. Fig. 4 is an elevational view of a modified form of air discharge associated with the air heater.

In the drawings 10 indicates the usual fire bowl of a furnace or a stove construction which includes the grate bars 11, the ash pit 12, and a door 13 providing access thereto and the grate shaking projection 15, all of which may be of the usual or any preferred construction as desired. The furnace door 16 provides access to the fire bowl for supplying the fire with fuel, herein shown as a bed of coals 17. The flames and products of combustion rise upwardly in the heater housing 18 and pass outwardly through the smoke pipe 19. The heater housing 18 is adapted to heat the air in exterior contact with the same and thus functions as a stove.

To assist and accelerate the starting of the fire, there is provided as an auxiliary feature to the main invention hereinafter to be described, an air intake chamber 20 having the supply openings 21; and positioned in said chamber 20 is a suitable source of power such as an electric motor 22 operating a fan or blower 23. Air drawn through the openings 21 by the fan or blower 23 passes through the passage 24 into a chamber 25 that communicates by means of the conduit 26 with the smoke pipe 19. A valve 27 controls said communication. Thus when the fire is to be started or accelerated, the fan 23 is actuated. Air passing out through the smoke pipe 19 and discharged by the conduit 26, the valve being in open position, creates a draft through the furnace construction aforesaid and accelerates the combustion therein. When the fire has started, or the desired rate of combustion has been attained, the valve 27 is closed and the fan or blower 23 discontinued, unless the same is desired to be utilized otherwise as hereinafter indicated.

The chief feature of the invention consists in an auxiliary air heater which includes a chamber 25 extending around the fire bowl 10, and said chamber 25 includes a plurality of openings 28 which are connected by upwardly extending conduits 29 to an enclosed air heating chamber 30. The air chamber 30 is provided with a central discharge 31, and telescopically associated therewith for adjustment is a discharge element or conduit 32 controlled by a valve or cover 33 which may be ornamental in character if desired and as herein illustrated. From the foregoing, therefore, it will be apparent that the air supplied by the fan 23 normally passes around through the channel 25, abstracting heat from the fire bowl and passes upwardly through the conduits 29 into the air heating chamber 30, and thence passes outwardly through the pipe 32 controlled by the ornamental cover valve 33. The products of combustion and heat containing gases pass upwardly from the fire bowl around the conduits 29, transferring additional heat to the air passing therethrough and then surround the air chamber 30, again transferring heat to the air in the chamber 30, and thence around the conduits 31 and 32 until said products of combustion and heated gases pass outwardly from the heater construction 18 through the smoke pipe 19.

To increase the heating of the air, there is provided in the chamber 30 a plurality of conduits 34 which pass upwardly through said chamber and discharge at the top thereof. Thus the heated gases rising from the fire also are adapted to pass directly through the chamber 30 without mixing with the air therein, but nevertheless transferring some of the heat to said air.

With the foregoing construction, the air in the room, which normally is only heated by contact with the casing 18, is circulated through, by means of the aforesaid construction, the hottest part or interior of the furnace construction without permitting said air to mix with the products of combustion. The actual results obtained from the aforesaid construction have indicated that a given room can be maintained at the desired temperature with the aforesaid construction with but the combustion of one-third the normal fuel supply necessary for heating the room when the auxiliary air heating interior construction herein illustrated is omitted.

When it is desired to utilize the aforesaid construction as a furnace, or when it is desired to utilize the same as a stove and supply rooms in an upper story with heated air, a header 133 is substituted for the discharge construction 33 shown in Fig. 1, see Fig. 4, and this header 133 is provided with a suitable number of outlets 134, each of which are adapted to convey, by means of the pipes 135, a portion of the heated air to the desired room or rooms.

While the invention has been described in great detail in the foregoing specification, the same is to be considered as illustrative and not restrictive in character and the many modifications thereof which will readily suggest themselves to those skilled in the art to which the invention applies, as well as those hereinbefore indicated and some of which have been illustrated, all are to be considered as within the purview of this invention, reference being had to the appended claims.

The invention claimed is:

1. An air heater construction comprising a fire bowl, a combustion chamber thereabove, a heat-transferring chamber superposed thereon and communicating therewith, means for supplying air to the exterior of the fire bowl for preheating the air, a heater construction above the fire bowl and combustion chamber and enclosed by the heat-transferring chamber and communicating with the air supplying means, passages through said air heater construction above the fire bowl for the products of combustion discharged into the combustion chamber and discharging into the heat-transferring chamber without permitting the products of combustion to mix with the air therein, and means for forcing the air through the heater construction.

2. A hot air heater comprising a fire bowl, a combustion chamber above the same, a heat-transferring chamber superposed thereon and communicating therewith, means for supplying air to the exterior of the fire bowl for preheating the air, a heater construction above the fire bowl and communicating with the aforesaid means for further heating the air therein by the products of combustion in said chambers, means for forcing the air through the heater construction, a smoke pipe for said air heater, a by-pass from said air supply to said smoke pipe for inducing a draft through the air heater, and a valve controlling said by-pass.

3. A hot air heater comprising a combustion portion and a normal heat-transferring portion, a supplementary air heater construction including a portion enclosing the combustion portion and a portion enclosed by the normal heat-transferring portion, means for forcing the air through the heater construction, a smoke pipe for said air heater, a by-pass from said air supply to said smoke pipe for inducing a draft through the air heater, and a valve controlling said by-pass.

4. An air heater construction comprising a fire bowl, a combustion chamber thereabove, a heat-transferring chamber superposed thereon and communicating therewith, means for supplying air to the exterior of the fire bowl for preheating the air, a heater construction above the fire bowl and combustion chamber and enclosed by the heat-transferring chamber and communicating with the air supplying means, passages through said air heater construction above the fire bowl for the products of combustion discharged into the combustion chamber and discharging into the heat-transferring chamber without permitting the products of combustion to mix with the air therein, means for forcing the air through the heater construction, a smoke pipe for said air heater, a by-pass from said air supply to said smoke pipe for inducing a draft through the air heater, and a valve controlling said by-pass.

In witness whereof, I have hereunto affixed my signature.

OLIVER P. M. PFAFFENBERGER.